United States Patent
Suzuki

(10) Patent No.: US 7,148,943 B2
(45) Date of Patent: Dec. 12, 2006

(54) LIQUID CRYSTAL DISPLAY DEVICE

(75) Inventor: Hidehiko Suzuki, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 12 days.

(21) Appl. No.: 10/802,006

(22) Filed: Mar. 16, 2004

(65) Prior Publication Data

US 2004/0183987 A1    Sep. 23, 2004

(30) Foreign Application Priority Data

Mar. 20, 2003   (JP)   ............... 2003-077816

(51) Int. Cl.
*G02F 1/1339*   (2006.01)
*G02F 1/1341*   (2006.01)

(52) U.S. Cl. ...................... 349/153; 349/190

(58) Field of Classification Search ............... 349/153, 349/189–190
See application file for complete search history.

(56) References Cited

U.S. PATENT DOCUMENTS

| | | | | |
|---|---|---|---|---|
| 5,037,185 A | * | 8/1991 | Grupp | 349/195 |
| 5,459,598 A | | 10/1995 | Carrington | 359/81 |
| 5,517,344 A | * | 5/1996 | Hu et al. | 349/153 |
| 6,219,126 B1 | * | 4/2001 | Von Gutfeld | 349/153 |
| 6,222,603 B1 | * | 4/2001 | Sakai et al. | 349/153 |
| 6,791,660 B1 | * | 9/2004 | Hayashi et al. | 349/190 |
| 6,836,311 B1 | * | 12/2004 | Hong | 349/153 |
| 2003/0086050 A1 | * | 5/2003 | Lee et al. | 349/153 |
| 2004/0041972 A1 | * | 3/2004 | Yanagawa | 349/153 |
| 2004/0160566 A1 | * | 8/2004 | Kawabe et al. | 349/153 |
| 2005/0073637 A1 | * | 4/2005 | Liao | 349/153 |
| 2005/0088603 A1 | * | 4/2005 | Hong | 349/153 |
| 2005/0094086 A1 | * | 5/2005 | Lee et al. | 349/153 |

FOREIGN PATENT DOCUMENTS

| | | |
|---|---|---|
| JP | 54-107752 | 8/1979 |
| JP | 5-5890 | 1/1993 |
| JP | 2001-133795 | 5/2001 |

* cited by examiner

*Primary Examiner*—James A. Dudek
(74) *Attorney, Agent, or Firm*—Greer, Burns & Crain, Ltd.

(57) ABSTRACT

A liquid crystal display device has a pair of substrates, a liquid crystal inserted in an annular seal between the substrates, and a threshold pattern provided in a frame portion between the annular seal and a pixel display area. The threshold pattern has an opening connecting the pixel display area with an area between the annular seal and the threshold pattern. The liquid crystal can move between the space in the threshold pattern and the area between the annular seal and the threshold pattern in response to the expansion and the contraction of the liquid crystal.

7 Claims, 4 Drawing Sheets

LIQUID CRYSTAL DISPLAY DEVICE

BACKGROUND OF THE INVENTION

1. Field of the Invention

The present invention relates to the production of a liquid crystal display device.

2. Description of the Related Art

A liquid crystal display device comprises a pair of substrates and a liquid crystal inserted between the substrates. One substrate is a TFT substrate forming TFTs, and the other one is a color filter substrate forming color filters. An annular seal comprising a photo-curable sealing agent is formed on one substrate. After the pair of substrates are bonded together, the annular seal is irradiated with ultraviolet rays so as to be cured. The liquid crystal is inserted into a region surrounded by the annular seal.

In a conventional method of producing a liquid crystal display device, an injection hole is formed in the annular seal, the liquid crystal is injected through the injection hole formed in the annular seal in a vacuum chamber after the substrates are bonded together. Thereafter, the injection hole in the annular seal is closed, and a liquid crystal panel comprising the pair of substrates is taken out from the vacuum chamber.

In producing the liquid crystal display device in recent years, there has been proposed a drip injection method (see, for example, Japanese Unexamined Patent Publication (Kokai) No. 2001-133795). In the drip injection method, an annular seal is formed on one substrate, and droplets of liquid crystal is dripped into the annular seal of one substrate. Then, the pair of substrates are bonded together in the vacuum chamber. According to the drip injection method, the injection of liquid crystal is completed at the same time as the substrates are bonded together, reducing the steps of production and lowering the cost of producing the liquid crystal display device.

In Japanese Unexamined Patent Publication (Kokai) No. 2001-133795, a rectangular seal having openings at four corners is provided, instead of a rectangular annular seal, the liquid crystal is dripped onto the area surrounded by the seal, and thereafter, the liquid crystal leaking from the openings are wiped and the openings are then sealed with a sealing member. Further, polar spacers are provided between the pair of substrates.

When the temperature of an environment in which the user is using the liquid crystal display device rises or drops, however, the volume of the liquid crystal filled in the liquid crystal display device expands or contracts, and the cell space of the liquid crystal display device becomes no longer capable of tolerating or absorbing a change in the volume of the liquid crystal. In the liquid crystal display device, for example, vacuum bubbles tend to be contained in the liquid crystal in the frame portion between the pixel display area and the annular seal. In an environment in which the user uses the liquid crystal display device, it is possible that the bubbles flow into the pixel display area from the frame portion due to a drop in the temperature of the environment causing a shading in the display. In producing the liquid crystal display device, therefore, the liquid crystal is used in slightly larger amounts so that the bubbles will not remain in the frame portion. When the temperature of the environment rises, however, expansion of the liquid crystal cell becomes no longer capable of dealing with the amount of expansion of the liquid crystal. When the liquid crystal display device is used in a nearly upright position, therefore, the excess of liquid crystal stays in a lower position of the liquid crystal display device due to the weight, and the thickness of the cell of this portion becomes irregular.

SUMMARY OF THE INVENTION

It is therefore an object of the present invention to provide a liquid crystal display device of which the display quality is not affected even by a change in the volume of the liquid crystal.

A liquid crystal display device, according to the present invention, comprises a pair of substrates, a liquid crystal inserted in an annular seal between the pair of substrates, and a threshold pattern provided in a frame portion between the annular seal and a pixel display area, the threshold pattern having an opening connecting the pixel display area with an area between the annular seal and the threshold pattern.

According to this constitution, the frame portion outside the pixel display area of the liquid crystal display device is effectively utilized to absorb and deal with a change in the volume of the liquid crystal caused by a change in the environment. It further becomes possible to increase an environmental margin for the amount of the liquid crystal in the liquid crystal display device produced by the drip injection method.

BRIEF DESCRIPTION OF THE DRAWINGS

The present invention will become more apparent from the following description of the preferred embodiments, with reference to the accompanying drawings, in which:

FIGS. 4A and 4B are views illustrating the liquid crystal display device when the volume of the liquid crystal decreases due to a drop in the environmental temperature, wherein FIG. 4A illustrates the migration of the liquid crystals from the area between the annular seal and the threshold pattern to the inside of the threshold pattern through the opening, and FIG. 4B illustrates a state where the inside of the threshold pattern is filled with the liquid crystals;

FIGS. 5A and 5B are views illustrating the liquid crystal display device when the volume of the liquid crystal increases due to a rise in the environmental temperature, wherein FIG. 5A illustrates the migration of the liquid crystal from the inside of the threshold pattern to the area between the annular seal and the threshold pattern through the opening, and FIG. 5B illustrates the migration of the liquid crystal in the area between the annular seal and the threshold pattern;

DESCRIPTION OF THE PREFERRED EMBODIMENTS

Embodiments of the present invention will now be described with reference to the drawings.

Figure 1:
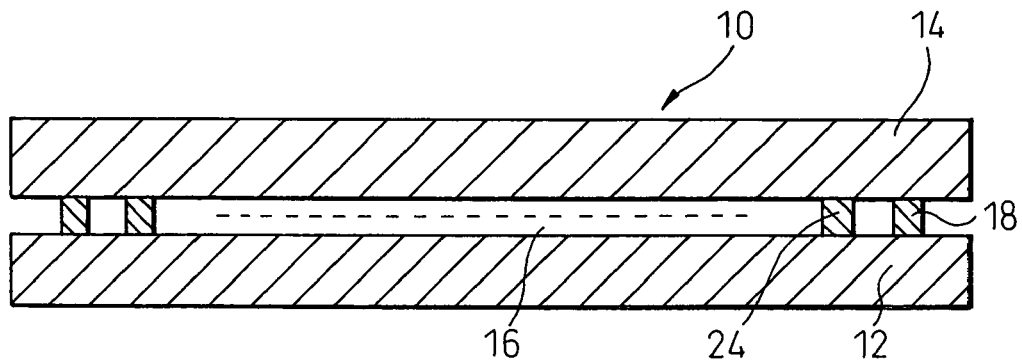
FIG. 1 is a schematical sectional view illustrating a liquid crystal display device according to an embodiment of the present invention.
Figure 2:
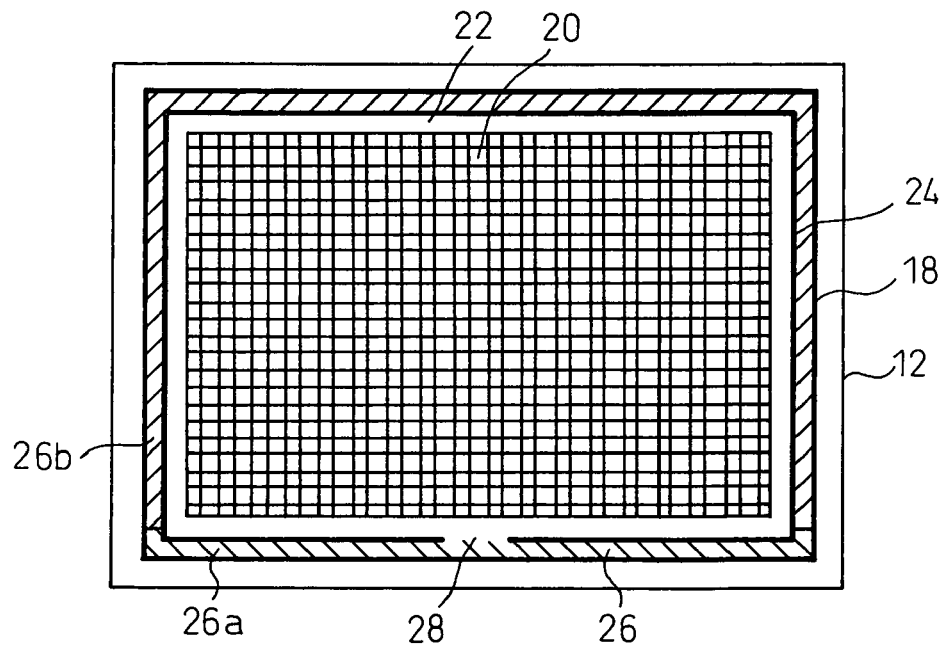
FIG. 2 is a plan view illustrating one substrate of FIG. 1.

FIG. 1 is a schematical sectional view illustrating a liquid crystal display device according to an embodiment of the present invention, and FIG. 2 is a plan view illustrating one substrate of FIG. 1.

In FIGS. 1 and 2, the liquid crystal display device 10 includes first and second substrates 12 and 14, a liquid crystal 16 inserted between the first and second substrates 12 and 14, and an annular seal 18 provided between the first and second substrates 12 and 14 so as to surround the liquid crystal 16. The liquid crystal display device 10 includes a pixel display area 20 and a frame portion 22 inside the annular seal 18.

A threshold pattern 24 is provided in the frame portion 22 between the annular seal 18 and the pixel display area 20. The threshold pattern 24 has an opening 28 connecting the pixel display area 20 (the inside of the threshold pattern 24) with the area 26 between the annular seal 18 and the threshold pattern 24. In FIG. 2, the annular seal 18 is formed in a continuous rectangular shape without an injection hole. A closed space is formed between the threshold pattern 24 and the annular seal 18 except for the opening 28.

The threshold pattern 24 annularly extends substantially in parallel with the annular seal 18 with a gap from the annular seal 18. Desirably, the opening 28 is provided at a lower position of the liquid crystal display device in an environment in which it is used (at a lower position when the liquid crystal display device 10 is used in a nearly upright position).

The liquid crystal display device 10 is an active matrix-type color liquid crystal display device, and one substrate is a TFT substrate forming TFTs and the other substrate is a color filter substrate forming color filters. The color filters, TFTs and pixel electrodes can be constructed in known manners and are not, therefore, described here in detail. There is, further, provided a known alignment film. The pixel display area 20 is the one where the TFTs and pixel electrodes are provided, and the frame portion 22 is an area covered with a black matrix surrounding the pixel display area 20.

Figure 7:
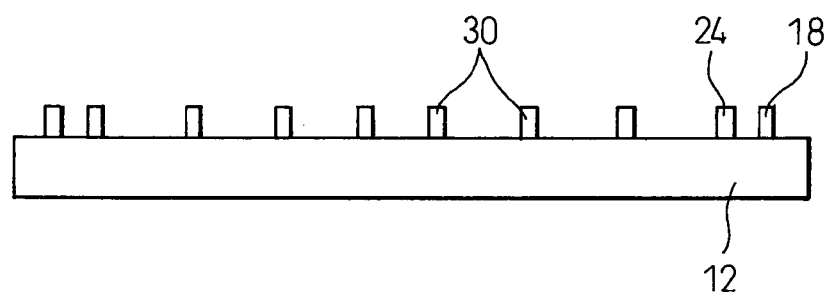
FIG. 7 is a view illustrating a substrate having a threshold pattern and polar spacers.

The threshold pattern 24 can be made of a material forming the annular seal 18. The threshold pattern 24 is applied together with the annular seal 18 when the annular seal 18 is to be applied onto the substrate 12. The threshold pattern 24 has substantially the same height as the annular seal 18. The threshold pattern 24 can be made of a material that forms the color filters. The threshold pattern 24 can be made of an organic film material (insulating film material) at the time of forming the films of the TFT substrate. The threshold pattern 24 can be made of a material forming the polar spacers. FIG. 7 illustrates an example of the polar spacers 30.

Figure 3:
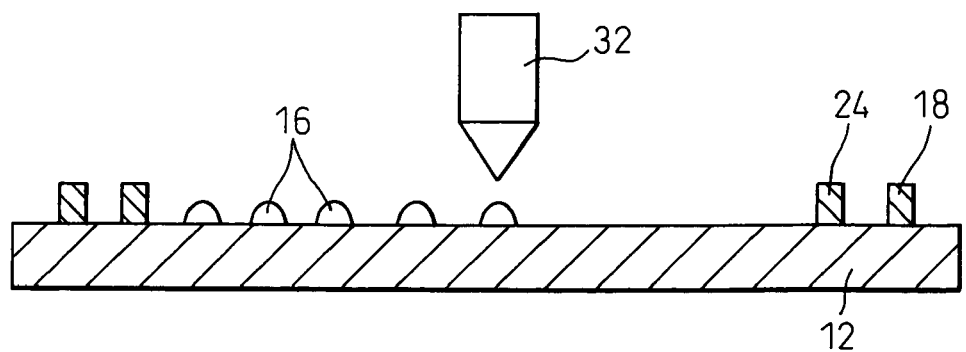
FIG. 3 is a view illustrating a drip injection method.

The liquid crystal display device 10 is produced by a drip injection method. FIG. 3 is a view illustrating the drip injection method. The liquid crystal 16 is dripped as droplets from a dispenser 32 onto the first substrate 12 (or the second substrate 14). The dispenser 32 drips the liquid crystal 16 in the form of droplets onto the region surrounded by the annular seal 18 while the dispenser 32 moves in the XY-directions. The liquid crystal 16 in the form of liquid droplets spread over the substrate 12.

The liquid crystal 16 fills the inside of the threshold pattern 24 and flows into the area 26 between the annular seal 18 and the threshold pattern 24 through the opening 28 of the threshold pattern 24. It is desired that the liquid crystal 16 flows in sufficient amount into the area 26 up to a predetermined position from the opening 28. As shown in FIG. 2, therefore, the area 26 includes a portion 26a where the liquid crystal 16 exists in sufficient amount and a portion 26b where the amount of the liquid crystal 16 is small and vacuum bubbles are contained. Basically, the bubbles in the area 26 tend to be collected in the upper portion of the liquid crystal display unit in a state where the liquid crystal display device is being used. By forming the opening 28 in the lower portion, therefore, the portion 26a where the liquid crystal 16 exists in a sufficient amount is located near the opening 28.

After the liquid crystal 16 is dripped onto the first substrate 12 (or the second substrate 14), the first substrate 12 and the second substrate 14 are bonded together with the annular seal 18 in a vacuum chamber. The annular seal 18 is then cured. The liquid crystal panel is thus completed.

Figure 4A:
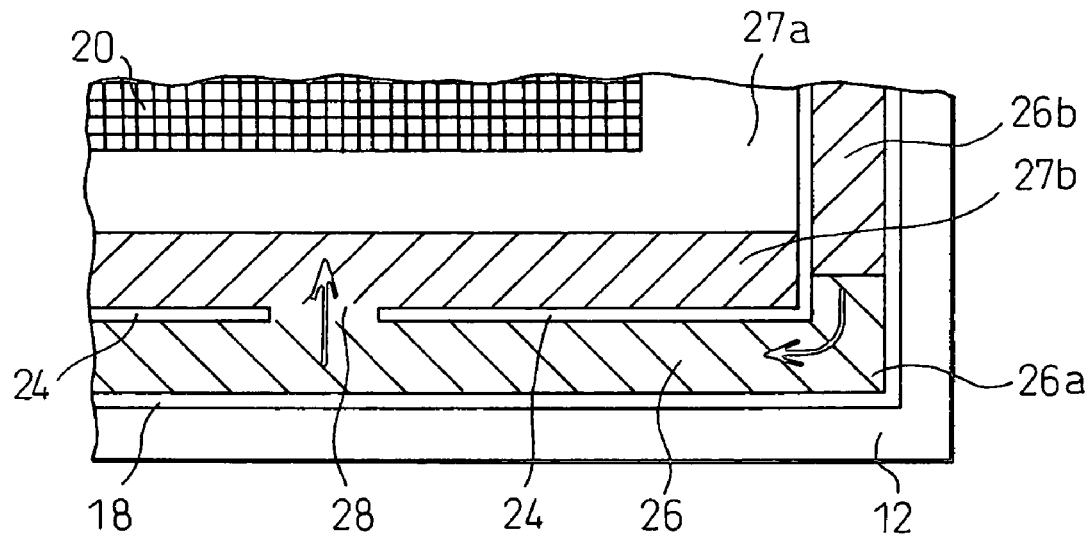
Figure 4B:
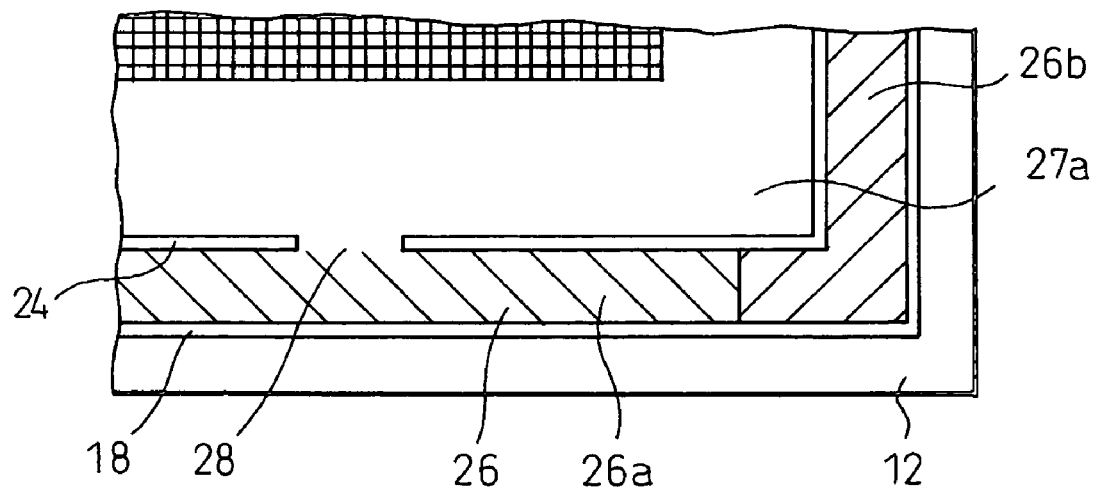

FIGS. 4A and 4B are views illustrating the liquid crystal display device when the volume of the liquid crystal decreases due to a drop in the environmental temperature and the like. As the volume of liquid crystal decreases inside the threshold pattern 24, the interior in the threshold pattern 24 includes a portion 27a where the liquid crystal 16 exists in sufficient amount and a portion 27b mixed in the portion 27a where vacuum bubbles are contained. As illustrated in FIG. 4A, therefore, the liquid crystal 16 migrates from the area 26 between the annular seal 18 and the threshold pattern 24 to the inside of the threshold pattern 24 through the opening 28. As illustrated in FIG. 4B, therefore, the interior of the threshold pattern 24 is filled with the liquid crystal 16, and there exists no portion 27b containing vacuum bubbles. In the area 26 between the annular seal 18 and the threshold pattern 24, a boundary between a portion 26a where the liquid crystal 16 sufficiently exists and a portion 26b where the amount of the liquid crystal 16 is small and vacuum bubbles are contained moves toward the opening 28.

In this way, when the volume of the liquid crystals decreases due to a drop in the environmental temperature, the liquid crystal in the area 26 near the opening 28 is supplemented into the pixel display area 20 where the liquid crystal is deficient, and no vacuum bubbles evolve in the pixel display area 20.

Here, if there exists the annular seal 18 only and there is no threshold pattern 24, a rise or a drop of the temperature of an environment in which the user is using the liquid crystal display device is accompanied by an expansion or a contraction of the volume of the liquid crystal filling the liquid crystal display device, and the cell space of the liquid crystal display device becomes no longer capable of tolerating or absorbing changes in the volume of the liquid crystal. In the liquid crystal display device, for example, vacuum bubbles tend to be made present and are contained in the liquid crystal in the frame portion between the pixel display area and the annular seal. In an environment in which the user uses the liquid crystal display device, it is possible that the bubbles flow into the pixel display area from the frame portion due to a drop in the environmental temperature, causing a shade in the display.

According to the present invention, the interior of the threshold pattern 24 including the pixel display area 20 is filled with the liquid crystal 16, and the portion 27b containing vacuum bubbles exists in the area 26 between the annular seal 18 and the threshold pattern 24, at a position remote from the port 28, so vacuum bubbles do not flow into the pixel display area 20 and become a cause of shading on the display is eliminated.

Figure 5A:
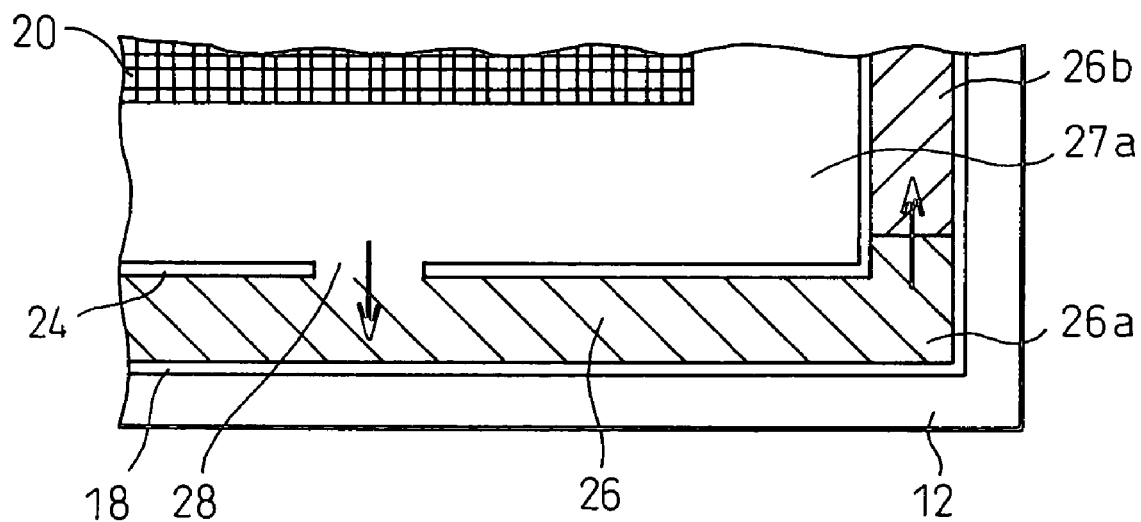
Figure 5B:
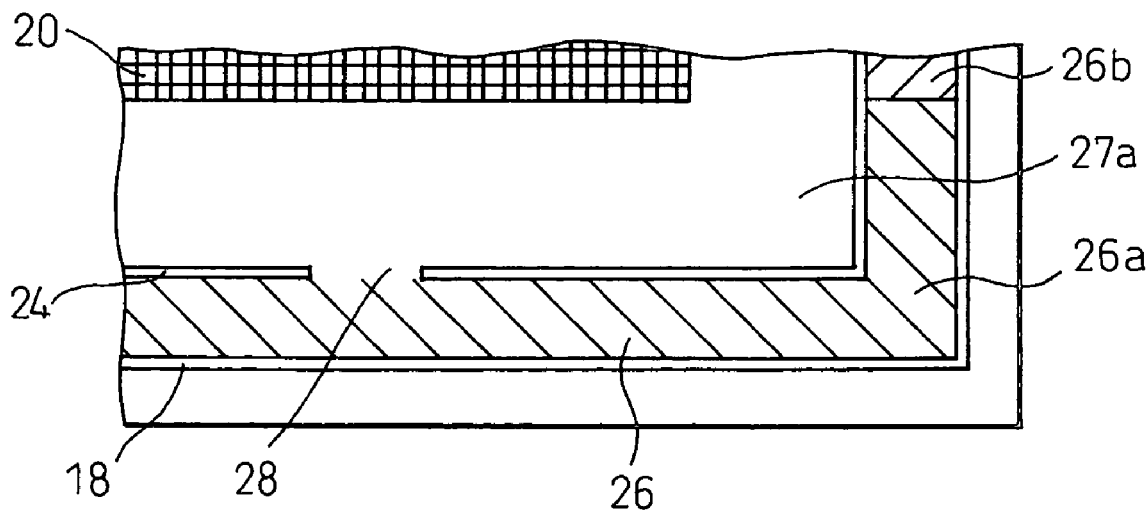

FIGS. 5A and 5B are views illustrating the liquid crystal display device when the volume of the liquid crystal increases due to a rise in the environmental temperature and the like. As the volume of liquid crystal increases inside the threshold pattern 24, the interior of the threshold pattern 24 is occupied by only the portion 27a where the liquid crystal 16 sufficiently exists, and the amount of the liquid crystal 16 becomes excessive. As illustrated in FIG. 5A, therefore, the liquid crystal 16 migrates from the interior of the threshold pattern 24 to the area 26 between the annular seal 18 and the threshold pattern 24 through the opening 28. As illustrated in FIG. 5B, therefore, the excess of liquid crystal 16 is expelled to the outer side of the threshold pattern 24. In the area 26 between the annular seal 18 and the threshold pattern 24, therefore, the boundary between the portion 26a where the liquid crystal 16 sufficiently exists and the portion 26b where the amount of the liquid crystal 16 is small and vacuum bubbles are contained, moves away from the opening 28.

In producing the liquid crystal display devices, so far, the liquid crystal is used in slightly large amounts. When the temperature of the environment rises, therefore, expansion of the liquid crystal cell becomes no longer capable of dealing with the amount of expansion of the liquid crystal. When the liquid crystal display device is used in a nearly upright position, therefore, the excess of liquid crystal stays at the lower position of the liquid crystal display device due to the weight, and the thickness of the cell of this portion becomes irregular.

According to the present invention, when the volume of the liquid crystal expands due to a rise in the environmental temperature, an excess of the liquid crystal in the pixel display area 20 passes through the opening 28 and flows into the area 26 which has room to accommodate the liquid crystal. Therefore, the problem that the excess of the liquid crystal stays at the lower position of the liquid crystal display device due to the weight, and the thickness of the cell of that portion becomes irregular, is overcome.

Figure 6:
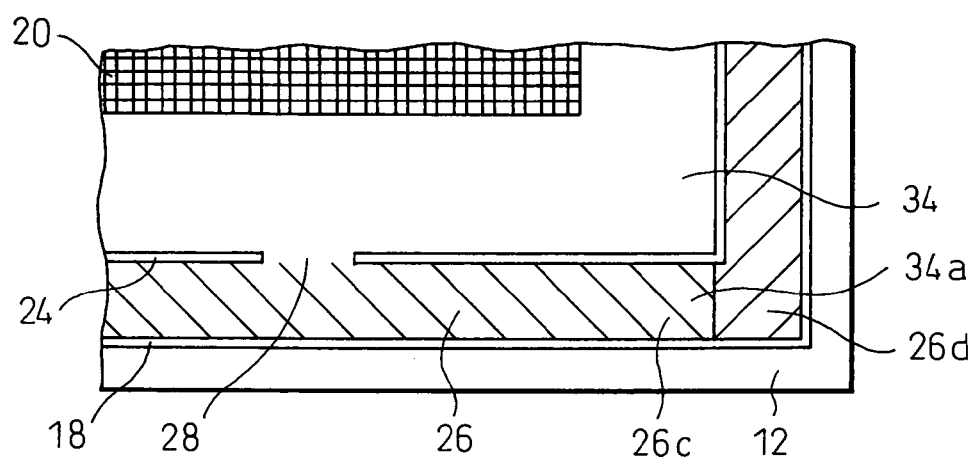
FIG. 6 is a view illustrating a modified example of the present invention.

FIG. 6 is a view illustrating a modified example of the present invention. In this example, the substrate 12 includes an alignment film 34. The alignment film 34 is provided inside the threshold pattern 24. Further, an alignment film 34a which is the same as the above alignment film is arranged on a first portion 26c close to the opening 28 in the area 26 between the annular seal 18 and the threshold pattern 24, and no alignment film is arranged in a second portion 26d which is farther than the first portion 26c from the opening 28.

The liquid crystal 16 tends to wet the alignment films 34 and 34a. In the area 26 between the annular seal 18 and the threshold pattern 24, therefore, the liquid crystal 16 tends to be locked by the first portion 26c where the alignment film 34a exists but is not locked by the second portion 26d without the alignment film. Therefore, the liquid crystal 16 tends to be concentrated in the first portion 26c close to the opening 28. The alignment film 34a is arranged over only a distance necessary for a margin in the amount of the liquid crystal.

Figure 8:
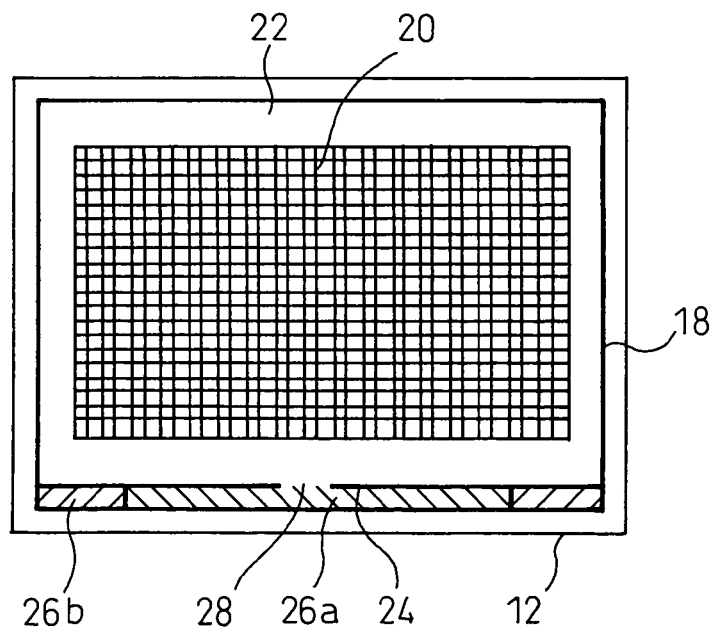
FIG. 8 is a view illustrating a modified example of the present invention.

FIG. 8 is a view illustrating a modified example of the present invention. The substrate 12 of FIG. 8 is the same as the substrate of FIG. 2 except for the shape of the threshold pattern 24. In FIG. 8, the threshold pattern 24 is formed substantially in parallel with one side of the annular seal 18 of a rectangular shape with a gap from the one side of the annular seal 18. The ends of the threshold pattern 24 come in contact with both side surfaces of the annular seal 18, and a space which is closed except the opening 28 is formed between the threshold pattern 24 and the one side of the annular seal 18. In the embodiment described above, the area 26 between the annular seal 18 and the threshold pattern 24 was of an annular shape. However, the area 26 of FIG. 8 is straight. In this case, too, the threshold pattern 24 having the opening 28 exhibits the similar operation as that of the above-mentioned embodiment, thus controlling vacuum bubbles that could not be controlled and providing an increased margin for a change in the volume of the liquid crystal caused by a change in the environmental temperature.

As described above, the present invention makes it possible to increase an environmental margin for the amount of the liquid crystal in the panel fabricated using a dripping and bonding device.

The invention claimed is:

1. A liquid crystal display device comprising a pair of substrates, a liquid crystal inserted in an annular seal between said pair of substrates, and a threshold pattern provided in a frame portion between said annular seal and a pixel display area, said threshold pattern having an opening connecting said pixel display area with an area between said annular seal and said threshold pattern, wherein an alignment film is arranged on a first portion near said opening in the area between said annular seal and said threshold pattern, and no alignment film is arranged on a second portion farther than the first portion from said opening.

2. A liquid crystal display device according to claim 1, wherein said threshold pattern extends substantially in parallel with at least one side of said annular seal.

3. A liquid crystal display device according to claim 1, wherein said threshold pattern annularly extends substantially in parallel with said annular seal with a gap from said annular seal.

4. A liquid crystal display device according to claim 1, wherein said threshold pattern extends substantially in parallel with at least one side of said annular seal with a gap from at least one side of said annular seal, and a closed space is formed between said threshold pattern and at least the one side of said annular seal except for said opening.

5. A liquid crystal display device according to claim 1, wherein the liquid crystal is dripped on one substrate, and the annular seal has no injection hole.

6. The liquid crystal display device according to claim 1, wherein the area between said annual seal and said threshold pattern includes:
   a portion where the liquid crystal exists in a sufficient amount; and
   a portion where the amount of the liquid crystal is small and vacuum bubbles are contained.

7. The liquid crystal display device according to claim 6, wherein:
   the opening is provided below the pixel display area;
   the portion where the liquid crystal exists in the sufficient amount is at a part near the opening; and
   the portion where the amount of the liquid crystal is small and vacuum bubbles are contained is at a part far from the opening compared with the part where the portion where the liquid crystal exists in the sufficient amount is located.

* * * * *